(12) United States Patent
Janzen et al.

(10) Patent No.: US 11,015,543 B2
(45) Date of Patent: May 25, 2021

(54) METHOD FOR DYNAMIC GAS PARTIAL PRESSURE CORRECTION OF AN INTERNAL COMBUSTION ENGINE WITH EXTERNAL MIXTURE FORMATION

(71) Applicant: Volkswagen AG, Wolfsburg (DE)

(72) Inventors: Michael Janzen, Wolfsburg (DE); Sven Mueller, Hannover (DE); Pierre Scheller, Velpke (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/886,888

(22) Filed: May 29, 2020

(65) Prior Publication Data

US 2020/0378328 A1 Dec. 3, 2020

(30) Foreign Application Priority Data

May 29, 2019 (DE) ..................... 10 2019 114 472.8

(51) Int. Cl.
| | |
|---|---|
| *F02D 41/14* | (2006.01) |
| *F02D 9/08* | (2006.01) |
| *F02D 41/00* | (2006.01) |
| *F02D 41/32* | (2006.01) |
| *F02M 35/104* | (2006.01) |
| *F02M 61/14* | (2006.01) |

(52) U.S. Cl.
CPC .............. *F02D 41/14* (2013.01); *F02D 9/08* (2013.01); *F02D 41/0002* (2013.01);
(Continued)

(58) Field of Classification Search
CPC ........ F02D 9/08; F02D 41/00; F02D 41/0002; F02D 41/009; F02D 41/14; F02D 41/32;
(Continued)

(56) References Cited

U.S. PATENT DOCUMENTS

| | | |
|---|---|---|
| 8,209,112 B2 | 6/2012 | Hartmann et al. |
| 10,551,236 B2 | 2/2020 | Heinken et al. |

(Continued)

FOREIGN PATENT DOCUMENTS

| | | |
|---|---|---|
| DE | 19829483 A1 | 1/2000 |
| DE | 10225306 A1 | 12/2003 |

(Continued)

*Primary Examiner* — John Kwon
*Assistant Examiner* — Johnny H Hoang
(74) *Attorney, Agent, or Firm* — Muncy, Geissler, Olds & Lowe, P.C.

(57) ABSTRACT

A method for dynamic gas partial pressure correction of an internal combustion engine with external mixture formation. A mixture formation is carried out in an intake manifold upstream of the cylinder of the internal combustion engine, and in which in addition to the gas partial pressure of the fresh air flowing continuously into the intake manifold, the gas partial pressure of the fuel, fed discontinuously into the intake manifold, is also taken into account. The gas partial pressure of the fuel, fed into the intake manifold, said pressure which is assumed to be stationary as a function of determined parameters, is dynamically adjusted for each of the cylinder-individual, temporally successive injections, discharged into the intake manifold, by means of a correction factor and a fresh air correction filling value.

14 Claims, 4 Drawing Sheets

(52) U.S. Cl.
CPC ........... *F02D 41/009* (2013.01); *F02D 41/32* (2013.01); *F02M 35/104* (2013.01); *F02M 61/145* (2013.01); *F02D 2200/0414* (2013.01); *F02D 2200/0606* (2013.01)

(58) Field of Classification Search
CPC ......... F02D 2200/04; F02D 2200/0414; F02D 2200/06; F02D 2200/0606; F02M 35/10; F02M 35/104; F02M 61/14; F02M 61/145

See application file for complete search history.

(56) References Cited

U.S. PATENT DOCUMENTS

| | | | | |
|---|---|---|---|---|
| 2001/0032637 | A1* | 10/2001 | Grieve | F02D 41/2451 123/674 |
| 2015/0121864 | A1* | 5/2015 | Surnilla | F02D 41/0072 60/605.2 |
| 2015/0354492 | A1 | 12/2015 | Surnilla et al. | |
| 2018/0347499 | A1* | 12/2018 | Wang | F02D 41/1401 |

FOREIGN PATENT DOCUMENTS

| | | |
|---|---|---|
| DE | 10 2004 049 737 A1 | 6/2006 |
| DE | 10 2005 007 057 A1 | 8/2006 |
| DE | 10 2005 047 446 A1 | 4/2007 |
| DE | 10 2005 055 952 A1 | 5/2007 |
| DE | 10 2008 042 819 A1 | 4/2010 |
| DE | 10 2017 105 853 A1 | 9/2018 |
| EP | 3376008 A1 | 9/2018 |

\* cited by examiner

METHOD FOR DYNAMIC GAS PARTIAL PRESSURE CORRECTION OF AN INTERNAL COMBUSTION ENGINE WITH EXTERNAL MIXTURE FORMATION

This nonprovisional application claims priority under 35 U.S.C. § 119(a) to German Patent Application No. 10 2019 114 472.8, which was filed in Germany on May 29, 2019, and which is herein incorporated by reference.

BACKGROUND OF THE INVENTION

Field of the Invention

The present invention relates to method for operating an internal combustion engine, in which a mixture formation is carried out in an intake manifold upstream of the cylinder of the internal combustion engine, and in which in addition to the gas partial pressure of the fresh air flowing continuously into the intake manifold, the gas partial pressure of the fuel, fed discontinuously into the intake manifold, is also taken into account.

Description of the Background Art

The publication DE 10 2005 047 446 A1, which corresponds to U.S. Pat. No. 8,209,112, describes a method for operating an internal combustion engine, wherein a characteristic variable is determined for a suction performance of a cylinder of the internal combustion engine. The characteristic variable is ascertained for the suction performance as a function of the mass flow flowing into an intake manifold of the internal combustion engine and a change in the intake manifold pressure is ascertained during an intake phase of the cylinder.

The publication DE 10 2005 055 952 A1 discloses a method for operating an internal combustion engine, wherein the internal combustion engine has an intake valve, an exhaust valve, an exhaust pipe, and an intake manifold, wherein the intake valve and the exhaust valve have a valve overlap, and wherein exhaust gases from the exhaust pipe are returned into the intake manifold. It is disclosed that a residual gas partial pressure of the residual gas in the combustion chamber is determined. Further, an air partial pressure of the air present in the combustion chamber at the time when the exhaust valve closes is determined as a function of the residual gas partial pressure. Finally, the air mass in the combustion chamber for the point in time when the intake valve closes is determined as a function of the air partial pressure.

In addition, the publication DE 10 2008 042 819 A1 explains a method which is used to determine a current residual gas rate in cylinders of an internal combustion engine with exhaust gas recirculation.

In summary, it is noted that the state of the art shows that the residual gas partial pressure or the exhaust gas partial pressure is included as a characteristic variable on the exhaust gas side of a cylinder of the internal combustion engine in process-related considerations during operation of an internal combustion engine.

SUMMARY OF THE INVENTION

It is therefore an object of the present invention to take into account the changing gas partial pressure of the fuel as a characteristic variable in the external mixture formation.

The partial pressure in gases and liquids is a partial pressure of a gas, i.e., its share of the total pressure, in particular in the case of a gas mixture, the partial pressure of the fuel and the partial pressure of the fresh air.

At present, the following initial situation exists for the external mixture formation in an internal combustion engine.

Gasoline engines with external mixture formation have a carburetor or an intake manifold in which fuel injection takes place (intake manifold injection). In the case of the external mixture formation, the mixture is formed outside the cylinder and only burns when it is ignited in the combustion chamber, that is, in the cylinder.

With positive and negative load changes of the internal combustion engine, lean (excess air $\lambda > 1$) or rich (lack of air $\lambda < 1$) excursions occur, particularly in the case of external mixture formation.

Corrections are already made in the case of an external mixture formation, but these always act too late because the respective fuel quantity has already been discharged.

In existing systems, the procedure is inherent to the system such that fresh air flows in continuously via the throttle valve but the fuel is injected intermittently, after which the mixture produced also flows out intermittently via the intake valves into the cylinders of the internal combustion engine.

In driving dynamics (the positive and negative load changes of the internal combustion engine), a variable amount of fresh air flows in continuously via the throttle valve, so that the gas partial pressure of the fuel and that of the fresh air always change due to load changes.

The gas partial pressure of the fuel is currently part of the determination of the fresh air charge in the cylinder and is currently not corrected dynamically, that is, as a function of the load change, in the area of the external mixture formation.

In particular, in the event of a load change, according to the invention, an absolute deviation of the dynamic fresh air mass, which arises during the time difference of the balancing time grid and is present as a dynamic correction filling value, is determined by means of the fresh air mass flow gradient, present in the balancing time grid, in relation to the absolute fresh air mass, which is considered to be stationary in the work cycle phases in the balancing time grid and is present as a stationary filling value.

As a result, according to the invention, the gas partial pressure of the fuel in the intake manifold after opening of the cylinder intake valve in the cylinder can be dynamically corrected depending on the determined correction filling value, taking into account a so-called prediction time, as a result of which a predetermined stoichiometric combustion air ratio A in the intake manifold can be continuously established and ensured in the dynamics as well in an improved manner.

The so-called filling prediction is a method in which the amount of air in the cylinder is calculated under physical boundary conditions at a point in time, "intake valve closes," the prediction point in time.

The gas partial pressure of the fuel has previously been assumed to be "stationary" as one of the physical boundary conditions, but the gas partial pressure of the fuel is not "stationary" as explained above, in particular in the dynamics due to load changes. The associated amount of fuel has already been determined and fed into the intake manifold on the basis of the "predicted" filling. With the currently predicted fuel filling, the mixture in the intake manifold is kept as neutral as possible $\lambda = 1$ via the exhaust gas-side lambda control so that no excursions into the rich or lean range occur, which, as previously explained, can only be approximately ensured in the dynamics. With the current filling prediction, it is assumed that there is a neutral mixture situation in the intake manifold.

The interface or the characteristic variable used for this is the current gas partial pressure of the fuel, which is assumed to be stationary and which represents the so-called displacement factor of the fuel in the intake manifold.

To simplify the current method, a physically incorrect assumption is thus made, which is incorrect because the gas partial pressures of the fuel and fresh air are not "stationary" but change dynamically within the work cycles of the cylinders connected to the intake manifold. As already mentioned, the problem is being addressed currently by means of the lambda control via measurements in the exhaust tract, as can be gathered from the state of the art. In the case of dynamic processes and the existing control-side segment run times, the lambda control cannot adapt or balance the mixture in due time. In addition, there is a disadvantage that the I component of the lambda controller winds up, as a result of which, if necessary, a mixture change/mixture deviation is produced which worsens the exhaust gas not only for a short time.

A method for operating an internal combustion engine is thus taught, in which a mixture formation is carried out in an intake manifold upstream of the cylinders of the internal combustion engine, and in which in addition to the gas partial pressure of the fresh air flowing continuously into the intake manifold, the gas partial pressure of the fuel, fed discontinuously into the intake manifold, is also taken into account.

According to the invention, the gas partial pressure of the fuel, fed into the intake manifold, said pressure which is assumed to be stationary as a function of predetermined parameters, is dynamically adjusted by means of a correction factor for each cylinder-individual, temporally successive injection, discharged into the intake manifold.

The correction factor is calculated in an intake manifold-side balancing time grid from a ratio of a fresh air filling value, assumed to be stationary in the balancing time grid, and a fresh air correction filling value, determined in the balancing time grid.

The correction factor is used in accordance with the ratio of the determined filling values for the dynamic correction of the stationary gas partial pressure, as a result of which there is for each cylinder-individual, temporally successive injection, discharged into the intake manifold, a dynamic gas partial pressure, which serves as a characteristic variable for calculating the respective cylinder-individual injection quantity into the intake manifold.

The intake manifold can be assigned a balance zone, in which the mass flow of the fresh air via a throttle valve, and the mass flow of the fuel via an injection nozzle, and the mass flow of the fresh air/fuel mixture via an intake valve are balanced.

In addition, it is preferably provided that a time difference between an end of feeding the fuel injection element at the time when the fuel injection element closes and a time when the respective intake valve of the cylinders closes is continuously determined individually for each cylinder in the balancing time grid.

The stationary fresh air filling value in the balancing time grid is calculated on the basis of a mass flow characteristic curve of the fresh air, assumed to be stationary in the balancing time grid in the phases, in the balancing time grid.

A gradient characteristic curve is used to determine a gradient of the mass flow, flowing in continuously via the throttle valve, and to integrate it into the balancing time grid, as a result of which there is the dynamic correction filling value of the fresh air in the balancing time grid.

According to the invention, the total amount of fresh air, from the dynamic correction filling value and the stationary filling value, is set in relation to the total amount of the stationary filling value of the fresh air, as a result of which the correction factor is formed.

Thus, it is ultimately advantageously provided in accordance with the invention that the stationary gas partial pressure is multiplied by the correction factor, which results in a correction value which corresponds to the dynamic gas partial pressure which is taken into account in each of the cylinder-individual, temporally successive injections, discharged into the intake manifold; i.e., the correction value, which, taking into account that an injection quantity has already been discharged with respect to a cylinder in the injection period before the balancing time grid, always takes place according to the invention—continuously corrected— in the next injection into the intake manifold with respect to a subsequent cylinder.

The system architecture for operating an internal combustion engine as a starting point of the invention, in which a mixture formation is carried out in an intake manifold upstream of the cylinders of the internal combustion engine, and in which in addition to the gas partial pressure of the fresh air flowing continuously into the intake manifold, the gas partial pressure of the fuel, fed discontinuously into the intake manifold, is also taken into account, comprises a first component in which a stationary gas partial pressure is calculated using predetermined parameters.

According to the invention, it is now provided that the first component is assigned further components from which a correction factor results, which is determined using the method of the invention, and which is multiplied in a component by the stationary gas partial pressure, which results in a correction value as the output variable of a fifth component, said value which corresponds to the dynamic gas partial pressure, which is taken into account in each of the cylinder-individual, temporally successive injections, discharged into the intake manifold.

A system architecture can be provided in which the predetermined parameters, in particular an intake manifold temperature, a split factor, a target lambda (A) value, a fuel/gas rail temperature, and characteristic values of the quality of the fuel, are supplied on the input side of the first component; as a result, the calculated stationary gas partial pressure is output as the output variable on the output side of the first component.

A system architecture can be provided in which the crankshaft angle of the crankshaft at the time and the crankshaft angle at the time as a function of the intake camshaft closing the intake valve are determined as input variables in a second component, and the crankshaft angles are converted into a time difference as the output variable of the second component by subtraction in a subtraction component and by multiplication with a conversion factor in a multiplication component.

In addition, a system architecture can be provided according to the invention, in which a mass flow via the throttle valve is fed on the input side to a third component, wherein in a gradient calculation component the gradient calculation of the gradient of the throttle valve mass flow takes place in the balancing time grid, which is subsequently limited upwards and downwards and smoothed in a gradient limiting component and a low-pass filter component before it is fed as an output variable to a multiplication component of a fourth component.

Furthermore, according to the invention, a system architecture can be provided in which the time difference as the output variable of the fourth component and the gradient of the throttle valve mass flow are fed to the multiplication component of the fourth component on the input side, wherein after the multiplication the dynamic correction filling value is present, which is added to the stationary filling in an addition component and is set in relation to the filling value in a ratio component, after which the correction factor arises as the output variable of the fourth component.

Finally, the system architecture for the correction factor as an input variable has a component in which the correction factor in a multiplication component is multiplied by the stationary gas partial pressure as the output variable from the first component with the correction factor, which results in the correction value.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
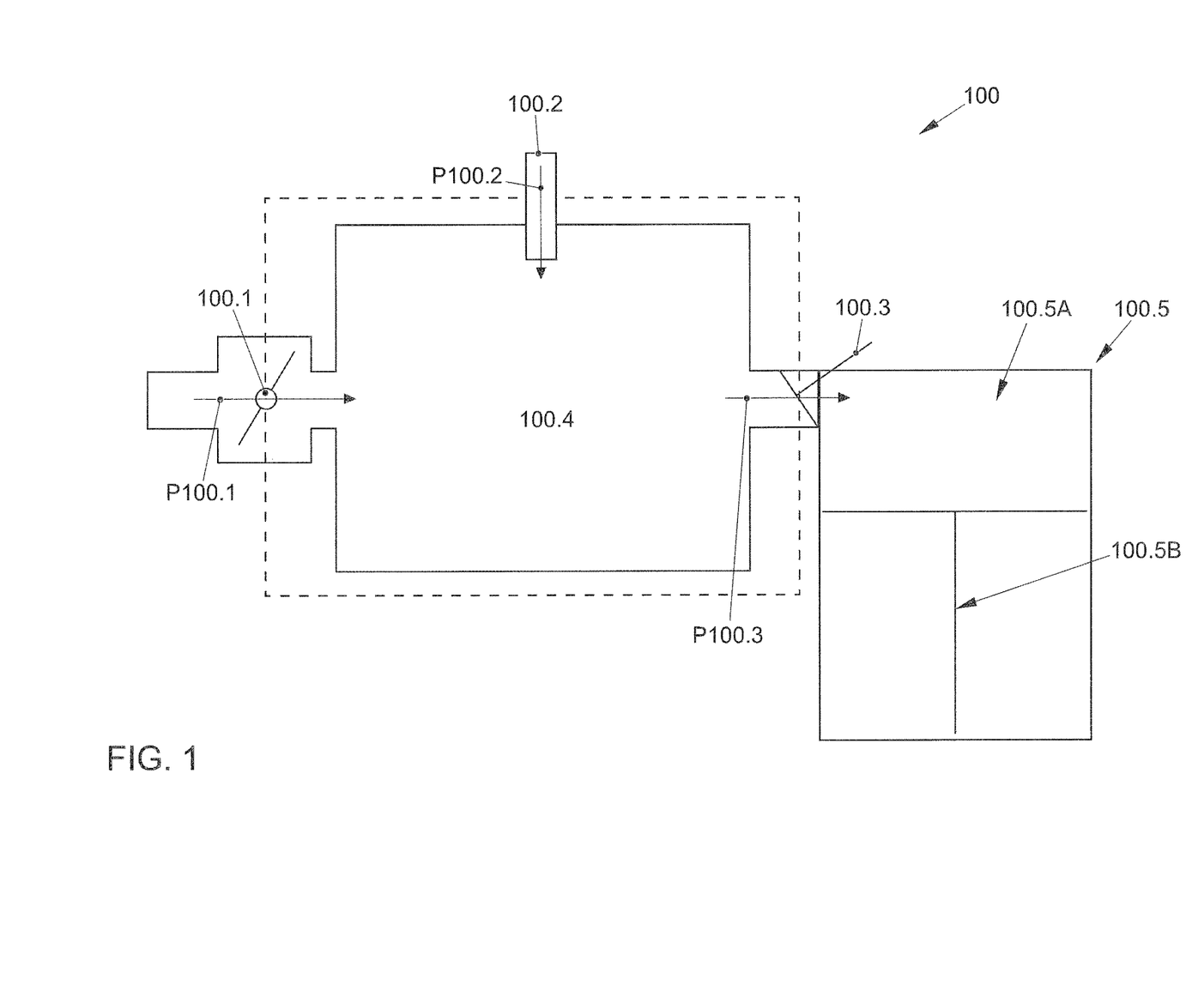
FIG. 1 shows a structural design of the components of an internal combustion engine.

As shown in FIG. 1, a gaseous fuel, for example, gasoline or natural gas, is supplied to intake manifold 100.4.

FIG. 1 shows a structural design of the components of an internal combustion engine 100.

In addition, a so-called balance zone is shown in FIG. 1, the importance of which will be explained in more detail.

Internal combustion engine 100 comprises, as components essential to the invention, a throttle valve 100.1, an injection nozzle 100.2 (hereinafter referred to as an injector), an intake valve 100.3 as an interface between intake manifold 100.4 and cylinder 100.5 of internal combustion engine 100, which in a known manner forms combustion chamber 100.5A for the mixture. Throttle valve 100.1 and injector 100.2 are assigned to intake manifold 100.4.

The mass flows via throttle valve 100.1, injector 100.2, and intake valve 100.3 within balance zone B are illustrated using arrows P100.1, P100.2, and P100.3 shown in FIG. 1, said flows which can be balanced in balance zone B.

Figure 2:
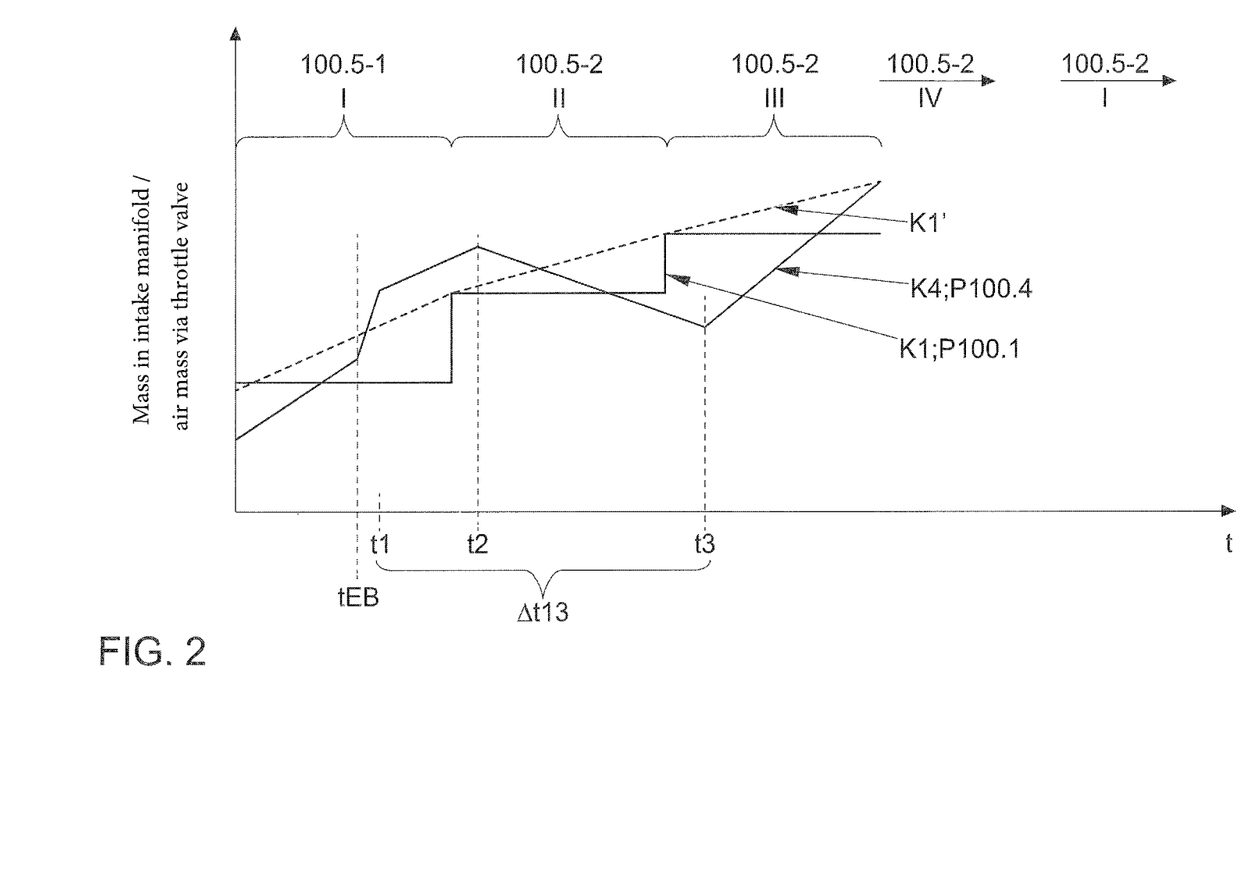
FIG. 2 shows a diagram to illustrate a cylinder-individual qualitative system behavior in the case of a positive load change selected in the exemplary embodiment.

FIG. 2, associated with FIG. 1, shows a diagram to illustrate a cylinder-individual qualitative system behavior in the case of a positive load change selected in the exemplary embodiment.

Different mass flows over time t, according to the X axis, are shown on the Y axis of the diagram in FIG. 2. On the Y axis of the diagram in FIG. 2, on the one hand, the real mixture mass flow P100.4 is shown over time t in intake manifold 100.4 in characteristic curve K4. On the other hand, on the Y axis of the diagram in FIG. 2, the mass flow P100.1 is shown in addition over time t of the continuously inflowing fresh air via throttle valve 100.1 in characteristic curve K1.

It becomes clear (compare characteristic curve K1) that the continuously inflowing fresh air via throttle valve 100.1 is assumed to be stationary in the phases I, II, III shown.

Within the crank angle intervals of phases I, II, III, IV, the stationary fresh air mass flow is usually calculated by means of averaging according to characteristic curve K1 using a crank angle-synchronous computational grid.

As a result, fresh air fillings per intake (compare intake phase II in the respective cylinders 100.5-$n$) can be expected over time with a stationary mass flow.

According to the invention, a time-defined crank angle interval is used as the balancing time grid $\Delta t13$ as the basis for the following method, as will be explained in more detail below.

In addition, the Y axis of the diagram in FIG. 2 shows the mass flow gradient 50 of throttle valve 100.1 according to the characteristic curve K', which can be assigned chronologically to the balancing time grid in time interval $\Delta t13$.

On the X time axis of the diagram in FIG. 2, the times tEB, t1, t2, and t3, which are essential to the invention, are defined individually for each cylinder in phases I, II, III (work phase IV not shown) of a work cycle of one of multiple cylinders 100.5-$n$.

The exhaust phase of a preceding cylinder 100.5-4 is marked with I, the intake phase of a first cylinder 100.5-1 is marked with II, and the compression phase of the first cylinder 100.5-1 is marked with III.

In the exhaust phase I of the preceding cylinder 100.5-4, the fuel is already supplied in intake manifold 100.4 via injector 100.2 (compare mass flow arrow P100.2 in FIG. 1) with respect to first cylinder 100.5-2.

The time tEB in FIG. 2 defines the start t1 of feeding the fuel into intake manifold 100.4 with respect to first cylinder 100.5-1, whereas the time t1 defines the end of feeding the fuel to intake manifold 100.4 with respect to first cylinder 100.5-1 within exhaust phase I of the preceding cylinder 100.5-4.

The time t2 defines the time at which intake valve 100.3 opens during intake phase II of piston 100.5B of first cylinder 100.5-2.

The time t3 defines the time at which intake valve 100.3 closes during the compression phase III of piston 100.5B of first cylinder 100.5-1.

The time t3 is the prediction time within the method; i.e., intake valve 100.3 of first cylinder 100.5-1 closes.

Taking into account the dynamic correction filling value $F_{dyn}$ in the balancing time grid 40, $\Delta t13$, the injection quantity in the injection period (tEB to t1) of the next injection into intake manifold 100.4 is dynamically corrected with respect to second cylinder 100.5-2 following the first cylinder, so that a dynamic correction of the gas partial pressure is determined in balancing time grid $\Delta t13$ via the ratio of the stationary filling quantity $F_{stat}$ of the absolute fresh air mass deviation, determined using mass flow gradient 50.

Figure 3:
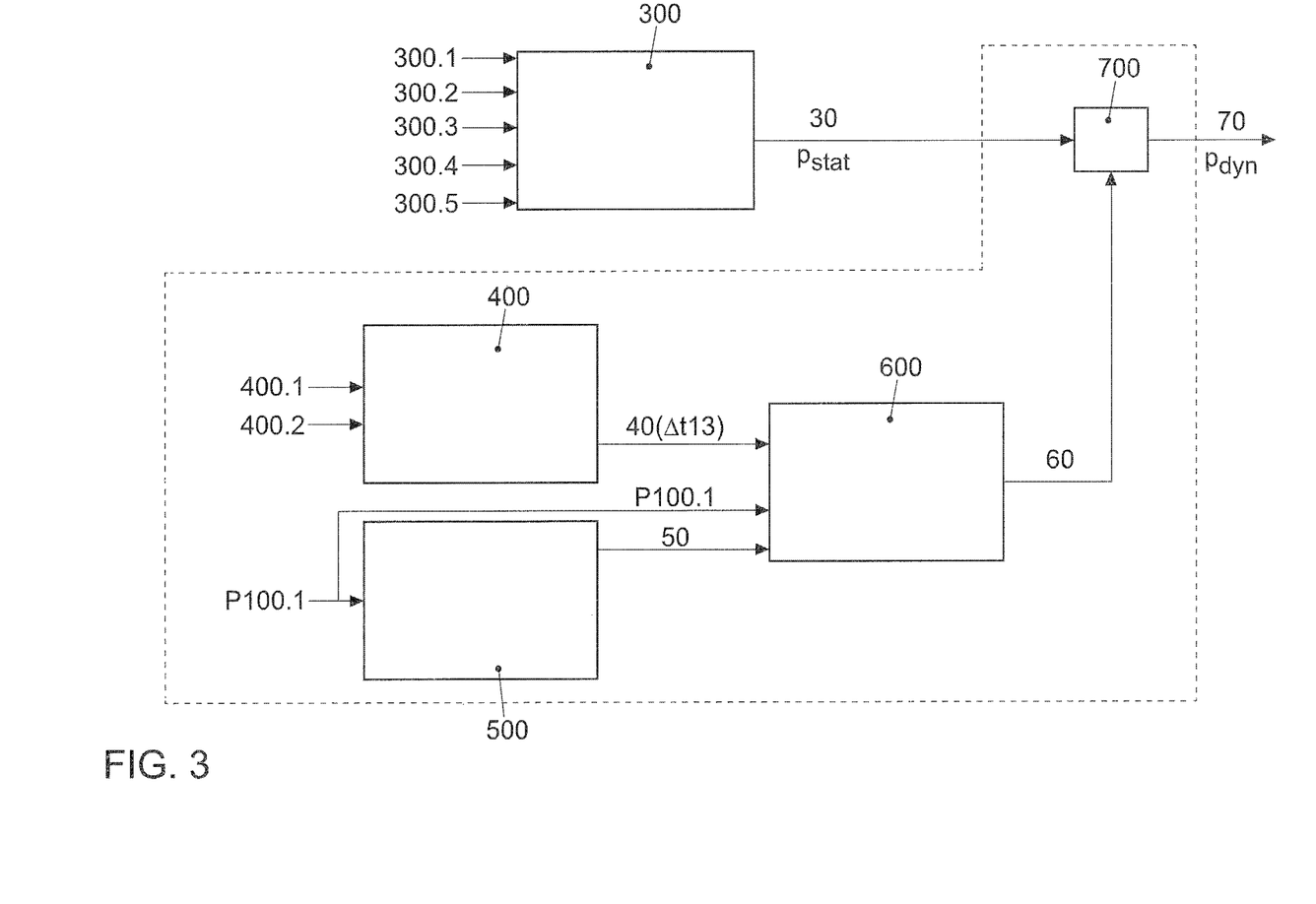
FIGS. 3 and 4 show the associated components of the system architecture.
Figure 4:
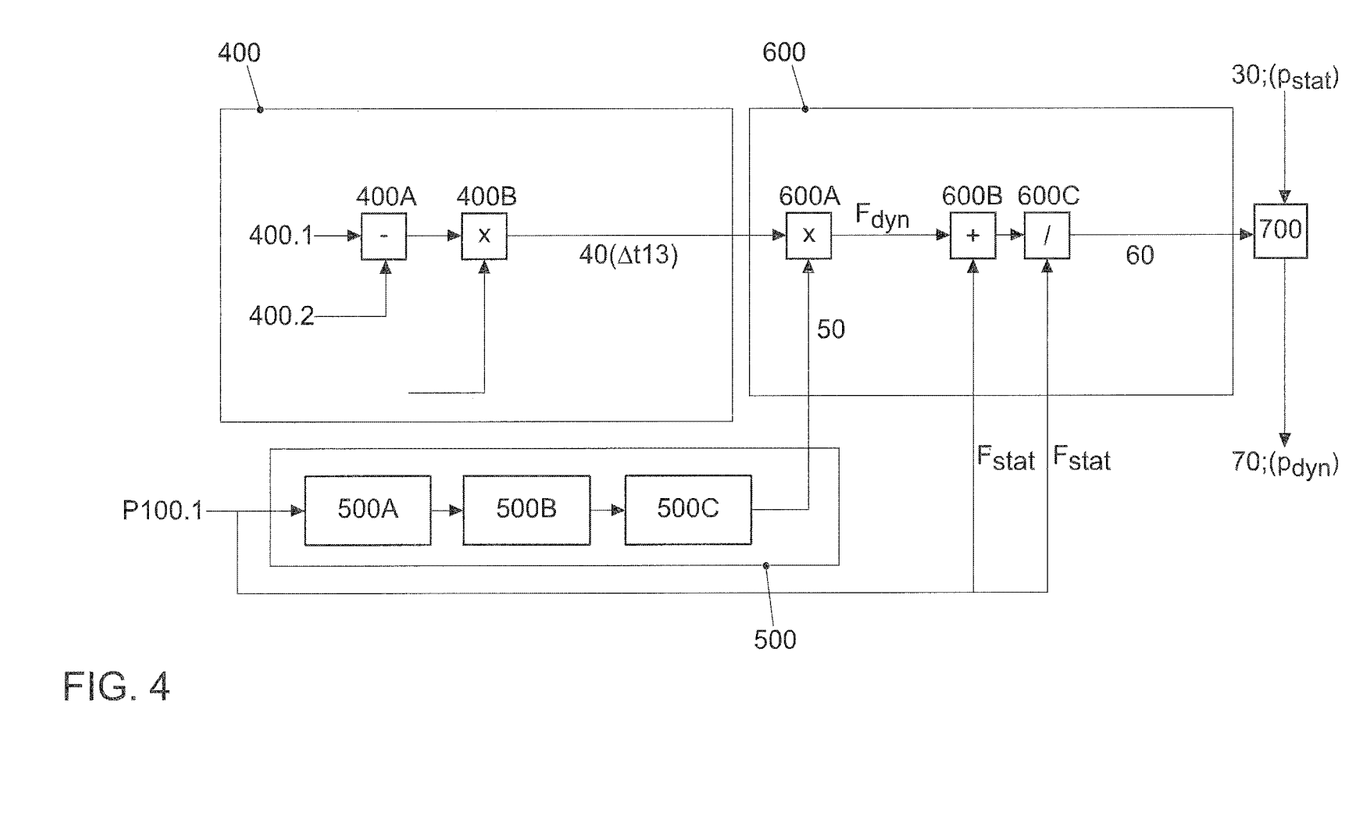

The system architecture of the solution of the invention is explained hereafter on the basis of FIGS. 1 and 2 and the following FIGS. 3 and 4.

FIGS. 3 and 4 show the associated components of the system architecture.

So far (compare FIG. 3), a stationary gas partial pressure calculation of the fuel has already been carried out in a first component 300 in the existing system architecture, but no dynamic corrections have been taken into account.

An intake manifold temperature 300.1, a split factor between gasoline and gas 300.2, a target lambda (λ) value 300.3, a fuel/gas rail temperature 300.4, and quality characteristic values 300.5 are used as input variables in the calculation of the stationary gas partial pressure of the fuel. The stationary gas partial pressure 30 of the fuel in intake manifold 100.4 is thus available as the output variable of component 300.

According to the invention, it is now taken into account that the gas partial pressure in the dynamics is not stationary but changeably "dynamic."

According to the invention, the time difference Δt13 is first determined in the balancing time grid between the end of the supplying tEB of the fuel last supplied at time t1 into intake manifold 100.4 in exhaust phase I (compare FIG. 2) of preceding cylinder 100.5-4 and the time t3 in compression phase III of subsequent cylinder 100.5-1, in which intake valve 100.3 of cylinder 100.5 closes.

It is understood that the time difference Δt13 varies depending on the output of the internal combustion engine.

In this time difference Δt13, more fresh air (possibly too lean mixture) can flow via throttle valve 100.1 in the dynamics in the positive load change, described by way of example, and less fresh air (possibly too rich mixture) in the event of a negative load change. In the case of a previously fixedly discharged amount of fuel, which is introduced into intake manifold 100.4 in FIG. 2 between the start of feeding the fuel at time tEB and the end of feeding at time t1, the mixture situation in intake manifold 100.4 changes dynamically until the intake valve of cylinder 100.5-1 closes.

According to the invention, the mass flow gradient 50 via throttle valve 100.1 is included in the correction method in accordance with the characteristic curve K1' in FIG. 2 for the fresh air determination in the balancing time grid Δt13.

Via the fresh air mass flow gradient 50 according to the characteristic curve K1', the dynamic correction filling value $F_{dyn}$ is calculated in time steps within the balancing time grid Δt13 via the previously determined time difference Δt13 between time t1 and time t3.

The dynamic correction filling value $F_{dyn}$ is added to the filling value $F_{stat}$ which is stationary in balancing time grid Δt13 according to mass flow P100.1 via throttle valve 100.1 according to the characteristic curve K1 in FIG. 2 and is related to the absolute filling value $F_{stat}$ present in the balancing time grid.

According to the invention, this results in a percentage change in the filling in intake manifold 100.4 in the balancing time grid Δt13, which is used according to the invention as correction factor 60 for the dynamic filling correction of the fresh air filling.

This correction factor 60 of the so-called dynamic filling correction of the fresh air filling in intake manifold 100.4 is multiplied by the stationary gas partial pressure $p_{stat}$, and the dynamic gas partial pressure $p_{dyn}$, determined thereby, is taken into account as the "dynamically corrected" partial pressure $p_{dyn}$ as output variable 70 in the calculation of the fuel injection quantity in the next injection event (tEB to t1) in intake manifold 100.4 with respect to the next cylinder 100.5-2.

This means that the "dynamically corrected" gas partial pressure $p_{dyn}$ is always corrected before each new injection into intake manifold 100.4 by the dynamic filling correction of the fillings (stationary filling value $F_{stat}$ and dynamic correction filling value $F_{dyn}$) by means of correction value 70 determined in the previous work cycle.

A second component 400, a third component 500, as well as a fourth component 600 and a fifth component 700 are used to determine the correction value 70 according to FIG. 3 within the system architecture.

In the second component 400 (compare FIG. 3), crankshaft angle 400.1 of the crankshaft at time t1 and crankshaft angle 400.2 as a function of the intake camshaft closing intake valve 100.3 are determined as input variables, and in component 400 (compare FIG. 4) by subtraction of crankshaft angles 400.1 and 400.2 in a subtraction component 400A and by multiplication with a conversion factor in the multiplication component 400B are converted into the time difference Δt13, so that it is present as output variable 40 of second component 400, which corresponds to the time difference Δt13 and therefore the balancing time grid.

In third component 500 (compare FIG. 3), mass flow P100.1, over time t, of the continuously inflowing fresh air via throttle valve 100.1 according to the characteristic curve K1, is determined as the input variable, from which the gradient of the throttle valve mass flow of throttle valve 100.1 is calculated as output variable 50 according to characteristic curve K1' according to FIG. 2.

The gradient calculation takes place in a gradient calculation component 500A (compare FIG. 4), wherein the gradient of the throttle valve mass flow in the balancing time grid Δt13, according to component 400, is limited upwards and downwards and smoothed in a gradient limiting component 500B (compare FIG. 4) and a low-pass filter component 500C (compare FIG. 4) before it is fed to a multiplication component 600A in component 600.

After multiplication, the dynamic correction filling value $F_{dyn}$ is present in multiplication component 600A. In an addition module 600B, the dynamic filling is added to the stationary filling and in a ratio component 600C related to filling value $F_{stat}$ which results in the correction factor 60 as an output variable.

Correction factor 60 represents the input variable for the fifth component 700, in which correction factor 60 is multiplied in the so-called multiplication component 700 by the stationary gas partial pressure $p_{stat}$ as the output variable from the first component 300 with correction factor 60; this results in the calculated correction value 70, which corresponds to the dynamic gas partial pressure $p_{dyn}$ which is taken into account in the next injection event into intake manifold 100.4 for calculating the injection quantity.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine, in which a mixture of fresh air and fuel is carried out in an intake manifold upstream of cylinders of the internal combustion engine, and in which in addition to a gas partial pressure of the fresh air flowing continuously into the intake manifold, a stationary gas partial pressure of the fuel fed discontinuously into the intake manifold is also taken into account, the stationary gas partial pressure being calculated using predetermined parameters, the method comprising:

calculating a correction factor in an intake manifold-side balancing time grid from a ratio of a stationary fresh air filling value and a fresh air correction value determined in the balancing time grid; and dynamically adjusting, via the correction value, the stationary gas partial pressure of the fuel fed into the intake manifold for each of temporally successive injections of the cylinders, such that for each of the temporally successive injections of the cylinders, a dynamic gas partial pressure is determined, the dynamic gas partial pressure being a characteristic variable for the calculation of respective cylinder injection quantities into the intake manifold.

2. The method according to claim 1, wherein the intake manifold is assigned a balance zone, in which a mass flow of the fresh air via a throttle valve and a mass flow of the fuel via an injection nozzle, and a mass flow of the mixture of the fresh air and the fuel via an intake valve are balanced.

3. The method according to claim 2, wherein a time difference between an end of feeding a fuel injection element at the time when the fuel injection element closes and a time when the respective intake valve of the cylinders closes is continuously determined individually for each cylinder in the balancing time grid.

4. The method according to claim 3, wherein the stationary fresh air filling value in the balancing time grid is calculated on the basis of a mass flow characteristic curve of the fresh air in the balancing time grid.

5. The method according to claim 3, wherein a gradient characteristic curve is used to determine a gradient of the mass flow of the fresh air, flowing in continuously via the throttle valve, and to integrate the gradient of the mass flow into the balancing time grid, and thus a dynamic correction filling value of the fresh air in the balancing time grid is calculated.

6. The method according to claim 5, wherein a total amount of fresh air, from the dynamic correction filling value and the stationary filling value, is set in relation to a total amount of the stationary filling value of the fresh air, as a result of which the correction factor is formed.

7. The method according to claim 1, wherein the stationary gas partial pressure is multiplied by the correction factor, which results in a correction value which corresponds to the dynamic gas partial pressure which is taken into account in each of the temporally successive injections of the cylinders discharged into the intake manifold.

8. The method according to claim 7, wherein the correction value with consideration that the injection quantity, which has already been discharged in an injection time period before the balancing time grid with respect to one of the cylinders is taken into account in a next injection into the intake manifold, which takes place with respect to a subsequent one of the cylinders.

9. A system architecture for operating an internal combustion engine, in which a mixture of fresh air and fuel is carried out in an intake manifold upstream of cylinders of the internal combustion engine, and in which in addition to a gas partial pressure of the fresh air flowing continuously into the intake manifold, a stationary gas partial pressure of the fuel fed discontinuously into the intake manifold is also taken into account, the system architecture comprising:

a component in which the stationary gas partial pressure is calculated using predetermined parameters, the component being assigned further components from which a correction factor results, the correction factor being multiplied in one of the further components by the stationary gas partial pressure, which results in a correction value as an output variable of the component, the correction value corresponding to a dynamic gas partial pressure, which is taken into account in each of temporally successive injections of the cylinders discharged in the intake manifold and the dynamic gas partial pressure being a characteristic variable for the calculation of respective cylinder injection quantities into the intake manifold, wherein the correction factor is calculated in an intake manifold-side balancing time grid from a ratio of a stationary fresh air filling value and a fresh air correction value determined in the balancing time grid.

10. The system architecture according to claim 9, wherein the predetermined parameters, including at least one of an intake manifold temperature, a split factor, a target lambda value, a fuel/gas rail temperature or characteristic values of the quality of the fuel, are supplied on the input side of the component, as a result of which the calculated stationary gas partial pressure is output as the output variable on the output side of the component.

11. The system architecture according to claim 9, wherein a crankshaft angle of a crankshaft at a first time and the crankshaft angle at a second time, as a function of the intake camshaft closing the intake valve, are determined as input variables in the one of the further components, and the crankshaft angles are converted into a time difference as the output variable of the one of the further components by subtraction in a subtraction component and by multiplication with a conversion factor in a multiplication component.

12. The system architecture according to claim 11, wherein a mass flow via a throttle valve is fed on the input side of another one of the further components, wherein in a gradient calculation component, a gradient calculation of the gradient of the throttle valve mass flow takes place in the balancing time grid, which is subsequently limited upwards and downwards and smoothed in a gradient limiting component and a low-pass filter component before the gradient is fed as an output variable to a multiplication component.

13. The system architecture according to claim 12, wherein the time difference as the output variable of the one of the further components and the gradient of the throttle valve mass flow are fed to an input side of the multiplication component, wherein after the multiplication, the dynamic correction filling value is present, which is added to the stationary fresh air filling value in an addition component and is set in relation to the stationary fresh air filling value in a ratio component after which the correction factor arises as the output variable.

14. The system architecture according to claim 9, wherein the correction factor is the input variable for the component, wherein the correction factor in the component is multiplied by the stationary gas partial pressure as the output variable from the component with the correction factor, which results in the correction value.

* * * * *